March 24, 1959  L. J. MAHLMEISTER  2,878,572
GAUGING DEVICE

Filed March 24, 1954  2 Sheets-Sheet 1

INVENTOR.
Louis J. Mahlmeister
BY Edward J. Noe Jr.
atty

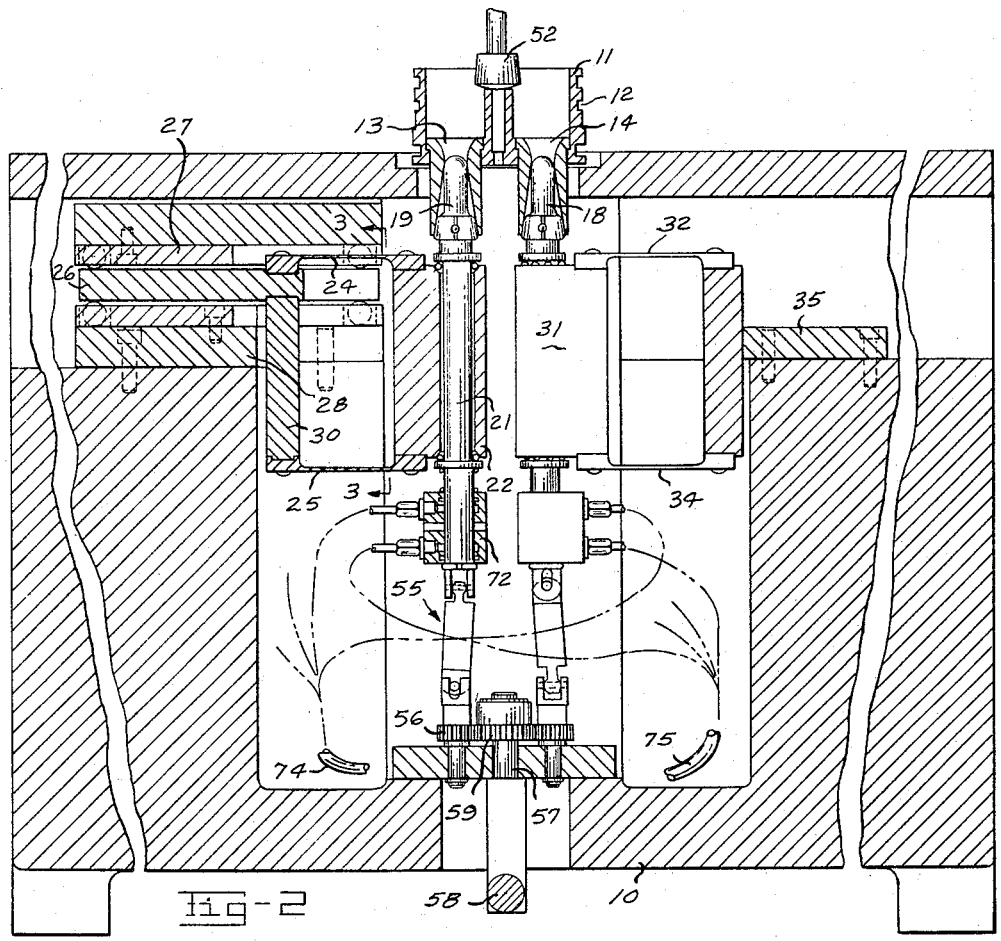
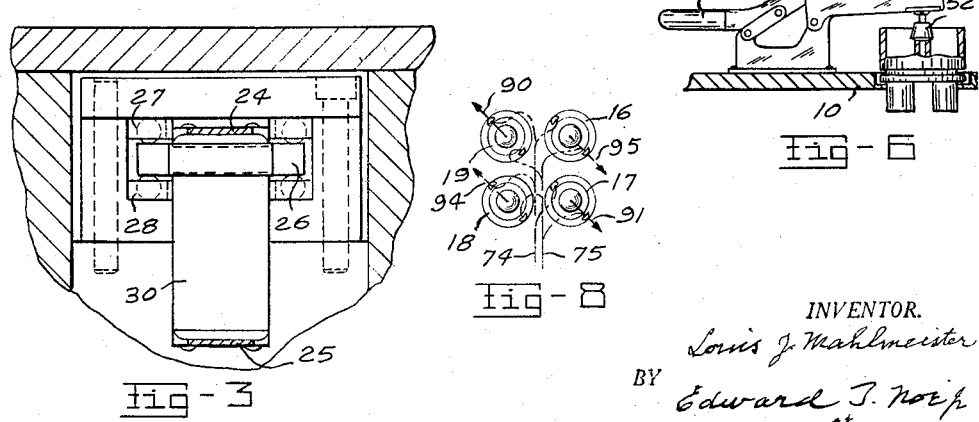

United States Patent Office 2,878,572
Patented Mar. 24, 1959

2,878,572

GAUGING DEVICE

Louis J. Mahlmeister, Dayton, Ohio, assignor, by mesne assignments, to The Sheffield Corporation, a corporation of Delaware Application March 24, 1954, Serial No. 418,287

18 Claims. (Cl. 33—174)

This invention relates to an apparatus for gauging the resultant disposition of a plurality of passages in a part.

One object of this invention is to provide a gauging apparatus wherein a plurality of gauge heads are associated with a corresponding plurality of passages in a part and indicating means connected to the gauge heads are responsive to the resultant inclination of the passage walls or the passage axes in parallel gauging planes passing through the gauge head axes.

Another object is to provide such an apparatus wherein each gauge head has gauging means at opposite sides thereof, each gauging means being responsive to the inclination of the passage wall at the respective side of the passage and wherein the gauging means facing in one direction connect to one indicating means and the gauging means facing in the other direction connect to another indicating means, the relationship of the responses of the indicating means indicating the resultant inclination of the passage axes, regardless of passage taper, out of round or the like.

Another object of this invention is to provide such an apparatus wherein the indicating means are continuously responsive as the gauge heads are simultaneously and equally rotated.

Another object is to provide such an apparatus wherein a part is held in gauging position with gauge heads in each passage, the gauge heads being carried with their axes relatively parallel and for free relative floating movements and operative for simultaneous and equal rotation during gauging.

Figure 1:
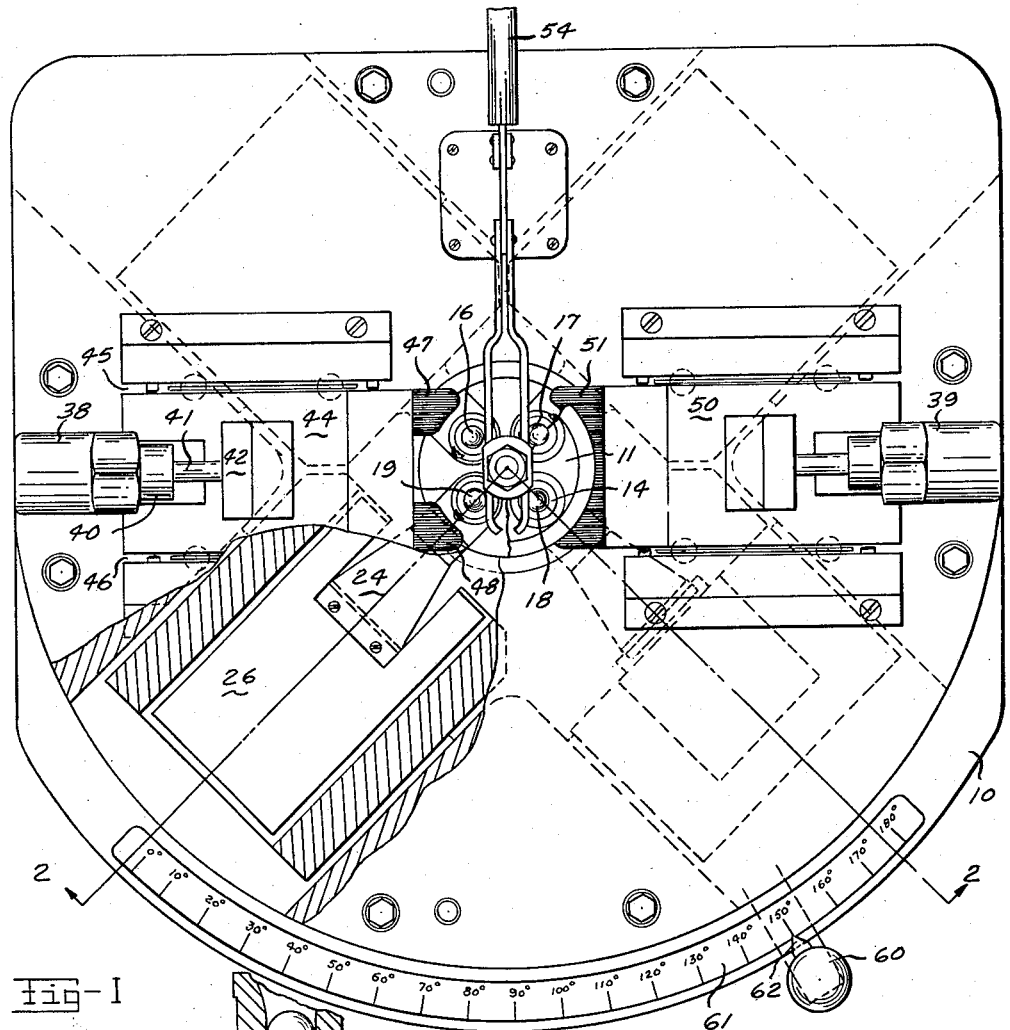
Figures 4, 5, 7:
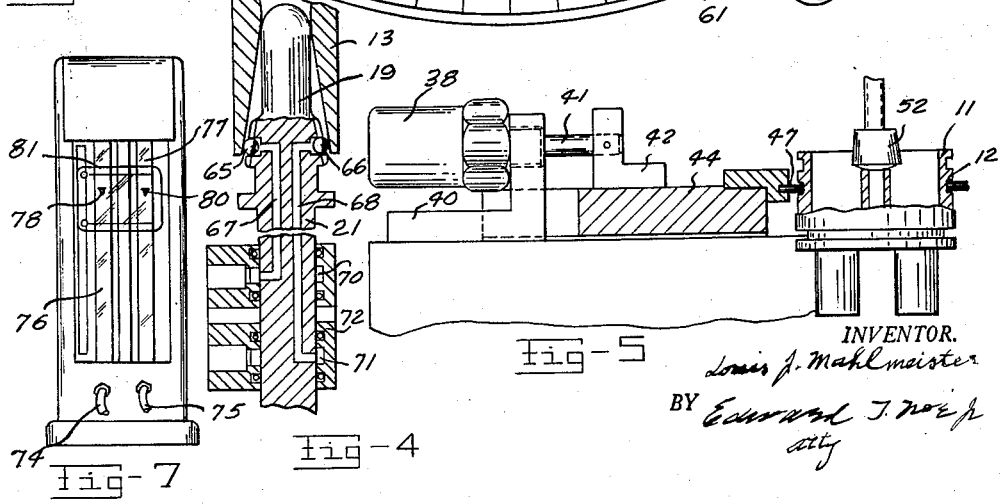

Other objects and advantages of the invention will be apparent from the following description, the appended claims and the accompanying drawings, in which, Figure 1 is a plan view of an exemplary apparatus embodying the present invention, shown with a portion of its upper surface broken away, Figure 2 is a sectional view of the apparatus taken along line 2—2 of Figure 1, Figure 3 is a detail section on line 3—3 of Figure 2, Figure 4 is a longitudinal central section of an exemplary gauge head shown in association with one of the passages in the part being gauged, Figure 5 illustrates in partial section one component of the air operated clamping means for the part, Figure 6 discloses diagrammatically a manually operated clamping means for the part, Figure 7 illustrates an available indicating instrument which is especially suitable for use with the apparatus of this invention, and Figure 8 is a diagram of the connections to the gauging means.

Corresponding numerals have been used to indicate like parts throughout the several figures of the drawings.

The gauging apparatus of this invention has been illustrated and will now be described as applied to gauging the resultant disposition of the axes of a plurality of nozzle passages in a rocket nozzle unit relative to the longitudinal axis of the unit. The purpose of the gauging in this exemplary application is to determine whether the ejection of propulsive fluid through the nozzles will result in a force along the axis of the rocket to give the desired straight movement of the rocket in its flight. It is to be understood that this application is intended only for illustrative purposes and that the apparatus of this invention is adapted for use wherever it is desired to accurately gauge the resultant disposition of the walls or axes of a plurality of passages in a part.

The rocket nozzle unit, which for example, has four tapered nozzle passages, is applied to four gauging spindles or heads which are carried with their axes parallel, for relative floating movements, and for simultaneous rotation in gauging. Each of the gauging heads has gauging means for cooperation with the walls of the nozzle passages and the gauging means are so interconnected to two indicating devices as to give an indication of the resultant disposition of the axes of the nozzle passages as the gauge heads are rotated.

Each gauge head is centered by contact with the associated passage wall at one axial position therealong. Displaced along the axis of each gauge head from its centering point a pair of diametrically opposed gauging means are provided for association with opposed points on the wall surface. Gauging planes including the diametrically opposed gauging means and the axis of each gauge head are relatively parallel between the gauge heads. The gauging means as illustrated utilize controlled leakage flow for their measurement. If a passage has a component of inclination in the gauging plane relative to the axis of its associated gauge head one gauging means will respond differently from the other and, in the illustrated embodiment, the leakage flow at one side will be greater than that on the other.

Through the connection of those gauging means facing in a common direction to a common indicating instrument each instrument will, in effect, respond to the algebraic sum of the inclinations of the passage walls in the gauging planes at one side of the axes of the gauge heads. A comparison of the indicating instrument indications will give an indication of the resultant inclination of the passages relative to the axis of the part. For example, if the axes of oppositely disposed nozzles are equally inclined in opposite directions the effects would cancel and the indications would be equal showing that the resultant is along the axis of the nozzle unit. The instruments can be initially set up so that the indications are equal if the passages are properly disposed.

The gauge heads are connected to a common drive means for rotation about their axes simultaneously and equally in gauging. By rotating the gauge heads the gauging planes are also rotated, while remaining parallel, thus giving an indication of the resultant inclinations of the passages in all directions as the gauge heads are rotated and the gauging instruments continuously respond.

The nozzle unit comprises a substantially cylindrical body 11 which has annular grooves in its outer surface. The groove 12 is the reference groove by which the nozzle unit is fastened to the rocket in the specific illustrated example. Four nozzle inserts two of which, 13 and 14 appear in Figure 2, are fixed to the nozzle unit body 11. The exemplary apparatus illustrated comprises a base 10 which carries part clamping means on its upper surface and suspends the gauge heads substantially centrally therein with their axes parallel to the reference axis of the part. Four gauge heads, 16, 17, 18 and 19, are associated respectively with the nozzle passages in the unit. Each of the gauge heads is rotatably carried in a supporting means mounted on the base 10.

Gauge heads 16, 17 and 19 are supported for limited transverse floating movement by structure which is identical in each instance. As shown in Figures 1 to 3 the gauge head 19 has shaft extension 21 which is rotatable within a holder 22. The holder 22 is supported on spring leaves 24 and 25 from a plate 26 which is suspended between balls held in pockets in upper and lower plates 27 and 28 fixed through an intermediate structure to the apparatus base 10. The lower spring leaf 25 is fastened to the lower end of an extension 30 fixed to the aforementioned slidable plate 26. Slidable plate 26 allows transverse movement of gauge head 19 relative to the others while maintining the gauge head axes parallel. The gauge head 18 is similarly supported in a holder 31 which is carried by spring leaves 32 and 34 from a supporting member 35 fixed to the apparatus base 10. Thus with three of the gauge heads 16, 17 and 19 carried for transverse floating the gauge heads can relatively position themselves for insertion into the passages in the nozzle unit 11 without binding.

The shafts which rotate the gauge heads are connected at their lower ends through an extensible and flexible drive linkage to a gear drive which is manually rotated for simultaneously and equally rotating the gauge heads in a gauging operation. Figure 2 illustrates this structure for the gauge head 19 wherein the inner shaft 21 continues below the holder 22 and is connected through drive linkage 55 to a pinion 56. The pinion 56 is one of four such pinions drivingly connected to the gauge heads and meshing with central gear 59. Gear 59 is rotated through a shaft 57 to simultaneously rotate the gauge heads. A crank arm 58 connected to shaft 57 extends out to the side of the apparatus where a handle 60 is provided for manual rotation of the gauge heads. Scale 61 is provided along the edge of the apparatus and a pointer 62 fixed to the handle 60 indicates the degree to which the gauge heads have been rotated.

The part can be positioned in gauging by any means which positions it downward against the resilient action of the spring supported gauging heads. As one way of accomplishing this a particular part clamping structure has been illustrated. Clamping means operated by air cylinders 38 and 39 engage the nozzle unit 11 in the reference groove 12 to support it by those surfaces which act as references in its mounting in the rocket. Figure 5 illustrates in partial section the air cylinder 38 and the structure which it actuates. The cylinder 38 is threaded into an L-shaped arm 40 fixed to the upper surface of the apparatus. A piston rod 41 is attached to a piston within the cylinder 38 and is pinned to an L-shaped member 42 fixed to slide 44 supported in ball ways 45 and 46 as indicated in Figure 1. The slide 44 carries two hardened contacts 47 and 48 adapted for engagement with one side of the groove 12 in the nozzle unit 11. At the opposite side of the apparatus a cylinder 39 operates a similar slide 50 which carries a hardened contact 51 to engage the other side of the groove 12. As the structure appears in Figure 1 a major portion of the nozzle unit 11 has been broken away to expose the gauging spindles 16, 17 and 19.

A vertical clamping contact 52 is provided to engage the nozzle unit at the center portion thereof and urge it downward against the contacts 47, 48 and 51 to seat these clamping contacts against one side of the reference groove 12 thus mounting the reference axis of the unit parallel to the axes of the gauge heads. The clamping contact 52 is operated by a simple toggle linkage illustrated in Figure 6, actuated manually through a handle 54.

Figure 4 illustrates the gauge head 19, which is typical of the gauge heads provided, and its shaft extension 21 in central section. The specific gauging means provided in the illustrated embodiment of the invention comprises two nozzle passage engaging balls 65 and 66 at diametrically opposite sides of the gauge head 19 which respectively control the fluid flow along passages 67 and 68. Each ball cooperates with an inwardly disposed orifice to control fluid flow. The balls are urged into contact with the passage wall by the fluid issuing through the orifices and are retained in the gauge head by a suitable retaining means, not shown. Fluid under pressure is supplied to passages 67 and 68 through annular grooves 70 and 71 provided in a connecting member 72 in which the inner shaft extension 21 is rotatable. The gauging plane containing the ball contacts 65 and 66 and the axis of gauge head 19 is parallel to similar planes containing the balls and axes of the other gauge heads 16, 17 and 18. Fluid is supplied to those gauging means at common sides of the gauge heads from a common source and through a common gauging instrument. Figure 2 indicates the relationship where tubes leading to gauge contacts facing the observer lead to a common conduit 74 and those tubes leading to the contacts facing in the opposite direction are joined in a conduit 75. Figure 8 illustrates this relationship diagrammatically, showing the connections from the various work engaging contacts to the common conduits 74 and 75.

Referring to Figure 4 it will be seen that the rounded upper tip of the gauge head 19 is in engagement with the passage wall of the nozzle 13 and is centered at one point along the length of the passage by contact. If the nozzle 13 were rocked clockwise as viewed in Figure 4 the contactor 66 would be moved inward restricting flow through passage 68 while the contactor 65 would move outward increasing the flow through passage 67. If the nozzle on the opposite side of the gauge head were equally inclined in a counterclockwise direction and in the same plane the orifice corresponding to that controlled by contactor 66 would be opened and the diametrically opposite orifice would be restriced. With all orifices facing in the same direction connected to a common conduit it will be seen that these effects would cancel out and the fluid flow through each of the tubes 74 and 75 would be equal.

In Figure 7 is illustrated a commercially available gauging instrument which can be used with the exemplary apparatus disclosed. In such instruments air under controlled pressure is led up through an internally tapered transparent flow tube and then to the gauging means. A float is positioned along the flow tube in accordance with the velocity of flow through the tube as determined by the controlled leakage and the dimension being gauged. The instrument in Figure 7 contains two such flow tubes indicated at 76 and 77 associated respectively with the conduits 74 and 75. Floats 78 and 80 in flow tubes 76 and 77 will respond to the controlled flow as determined by the positions of the work contacting balls in the gauge heads.

In the illustrated apparatus it is the relative positions of the floats 78 and 80 which is an indication of the resultant of the passage inclinations relative to the axis of the unit 11 in the gauging planes. The floats 78 and 80 will continuously respond to the gauging means as the gauge heads are rotated, indicating at any instance in the rotation by the difference in their positions the summation or resultant inclination of the nozzle passages relative to the axis of the nozzle unit 11. A transparent plate 81 which is vertically slidable along the face of the instrument has scribed lines thereon spaced apart a predetermined distance as determined by the inclination tolerance. At any point the rotation of the gauge heads can be stopped and the plate 81 slid to see if the scribed lines will bracket the float positions.

In Figure 8, lines 90 and 91 serve to indicate schematically passage inclinations if opposite passages were equally divergent outwardly from the axis of the nozzle unit 11 and toward the observer. In such a situation the orifices facing outwardly will be equally closed and those facing inwardly equally opened, with no resultant change in the relative float positions. It will also be seen that if two of the nozzle passages at opposite sides of the nozzle unit body 11 were skewed as indicated at 94 and 95 in Figure 8 they would cause the rocket to rotate about its longitudinal axis but the resultant of these two passages will lie along the axis of the nozzle unit and the flight would be straight.

If a passage were out of round but has its axis parallel to the axis of the nozzle unit 11 the opposite contactors on the gauge head would be affected equally and the floats would remain alongside one another in the instrument. Thus, without computation, out-of-round, taper or other irregularities in the passage configuration are automatically compensated for and the relative position of the floats indicate the resultant or the algebraic sum of the passage inclinations in the gauging planes at the moment of gauging.

It is preferred to have a pair of diametrically opposed gauging means on each gauge head, the gauging means being connected to means for indicating the resultant disposition of the part passages. However, a gauging operation can be carried out with a single gauging means on each gauge head, all facing in a common direction and connected to a single indicating means. In this latter application by noting the indication with the gauging means at one location and then rotating the gauge heads 180° and again noting the indication a comparison of the indications obtained will give a measurement of the resultant disposition of the passages in the planes in which the gauging occurred.

Because of the unique interrelationship between the gauging means of this invention a study of the resultant disposition of a plurality of passages in a part is made possible and with precision. Through relative rotation between the part and the gauge heads a study of the resultant inclination in different gauging directions can be made. With the gauge heads relatively floating and resiliently biased into the part passages compensation is automatically made in gauging for a range of relative dispositions between the passages and parts can be placed in gauging position more rapidly. Accurate and repeated gauging operations can be carried out by unskilled operators over a long useful service life because the apparatus is basically simple in operation and construction.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An apparatus for gauging the relationship of a plurality of passages in a part with respect to a given axis of the part comprising: a base, means carried from said base for locating a part in gauging position, gauge heads carried from said base with their axes in predetermined angular dispositions relative to the given axis of the part for floating movement transverse their axes and for reception into the part passages, each gauge head comprising gauging means for gauging the inclination of the respective passage wall relative to the given axis of the part in a gauging plane containing the gauge head axis, each gauge head including centering means spaced axially from the gauging means for engagement with one section of the passage wall to center the gauge head relative thereto, and indicating means operatively connected to the gauge means and responsive to the passage wall inclinations in said gauging planes with respect to the gauge head axes.

2. An apparatus for gauging a plurality of passages in a part comprising: a base, means carried from said base for locating a part in gauging position, a plurality of gauge heads, one for each passage, means rotatably carrying said gauge heads from said base with their axes in a predetermined angular relationship and for reception into the part passages, the gauge heads comprising means axially spaced therealong cooperating for gauging the inclination of the respective passage walls relative to the axes of the gauge heads in gauging planes containing the gauge head axes, means operatively connected to each of said gauge heads for simultaneous rotation of the gauge heads about their axes to change the direction of gauging, and indicating means connected to the gauge heads continuously responsive to the resultant of the inclinations of the passage walls in the gauging planes with respect to the gauge head axes as the gauge heads rotate.

3. An apparatus for gauging a plurality of passages in a part comprising: a base, means carried from said base for locating a part in gauging position, gauge heads for reception into the part passages, means carrying said gauge heads from said base with their axes in a predetermined angular relationship to each other and for limited floating movement transverse their respective axes, each gauge head comprising means axially spaced therealong cooperating for gauging the inclination of the respective passage wall relative to the given axis of the part in a gauging plane containing the gauge head axis, the gauging planes being parallel to each other, and indicating means operatively connected to the gauge heads and responsive to the algebraic sum of the passage wall inclinations in the gauging planes relative to the given axis of the part.

4. An apparatus for gauging a plurality of passages in a part comprising: a base, means carried from said base for locating a part in gauging position, a plurality of gauge heads, one for reception in each of said passages, means rotatably carrying said gauge heads from said base with their axes in a predetermined angular relationship and for limited relative floating movement transverse their axes, each gauge head comprising contact means for engagement with one section of the passage wall to center the gauge head relative thereto and gauging means axially disposed along the axis of the gauging head from the contact means responsive to the displacement of the passage wall with respect to the gauge head axis, each of the gauging means being disposed at a common side of the plurality of gauge heads, means operatively connected to said gauge heads for simultaneous coordinated rotation of the gauge heads about their respective axes to change the direction of gauging, and indicating means connected to said gauging means continuously responsive to the passage wall inclinations as the gauge heads rotate.

5. An apparatus for gauging a plurality of passages in a part comprising: a base, means carried from said base for locating a part in gauging position, a plurality of gauge heads, one for reception into each passage, means rotatably carrying said gauge heads from said base with their axes in parallel relationship and for relative floating movements transverse their axes, each gauge head comprising means spaced along the gauge head axis cooperating for gauging the inclination of the passage wall relative to the axis of the gauge head in a gauging plane containing the gauge head axis, the gauging planes being parallel to each other, means operatively connected to each of said gauge heads for simultaneous equal rotation of the gauge heads about their respective axes, and indicating means connected to the gauge heads continuously responsive to the algebraic sum of passage wall inclinations in the gauging planes as the gauge heads rotate.

6. An apparatus for gauging a plurality of similar tapered passages in a part comprising: a base, means carried from said base for locating a part in gauging position, gauge heads for reception into the part passages from the larger end thereof, each gauge head comprising contact means for engaging a section of the respective passage wall to center the gauge head relative thereto and gauge means axially disposed along the axis of the gauge head from the contact means responsive to the displacements of the passage wall at that axial location relative to the axis of the gauge head, the gauging means being disposed at a common side of each of the gauge heads, means carrying said gauge heads from said base for relative floating movements transverse the gauge head axes while the gauge heads remain parallel and with a resilient bias of the gauge heads into the part passages, and indicating means operatively connected to the gauging means and responsive to the algebraic sum of the passage wall inclinations relative to the axes of the gauge heads.

7. An apparatus for gauging a plurality of passages in a part comprising: a base, means carried from said base for locating a part in gauging position, a plurality of gauge heads, one for reception into each of said passages, means rotatably carrying said gauge heads from said base with their axes in parallel relationship for relative floating movement transverse their axes and for insertion into the part passages, each gauge head comprising contact means for engagement with one section of the respective passage wall for centering the gauge head relative thereto and a pair of diametrically opposed gauging means axially displaced along the axis of the gauge head from the contact means for association with opposed passage wall sections, the pairs of gauging means lying at the extremities of gauge head diameters which are relatively parallel between the gauge heads, a first indicating means connected to the gauging means facing in one common direction and responsive thereto and a second indicating means connected to the oppositely disposed gauging means and responsive thereto.

8. The apparatus of claim 7 further comprising an adjustable means operatively connected to each of said gauge heads for simultaneous, equal rotation of the gauge heads about their axes in a gauging operation.

9. An apparatus for gauging a plurality of passages in a part comprising: a base, means carried from said base for locating a part in gauging position, a plurality of gauge heads, one for reception into each of said passages, means carrying said gauge heads from said base with their axes in parallel relationship and for relative floating movements transverse their axes, each carrying means including bearing means by which the respective gauge head is carried for rotation about its axis, each gauge head comprising air leakage gauging means associated with the passage wall for gauging the inclination of the passage wall relative to the axis of the gauge head in a gauging plane which includes the gauge head axis, the gauging planes being parallel to each other, a shaft extension connected to each of said gauge heads and passing through the respective bearing support, a pinion fixed to each shaft extension, a common gear meshing with the pinions, manually operable means to rotate said gear operatively connected thereto, indicating means cooperating between said base and said manually operable means for indicating the degree of rotation of the gauging heads, and an indicating means connected to said air leakage gauging means responsive to the algebraic sum of passage wall inclinations as the gauging heads rotate.

10. An apparatus for guaging a plurality of similar tapered passages in a part comprising: a base, means carried from said base for engaging and locating a part, a plurality of gauge heads, one for reception into each of said passages from the larger end thereof, means rotatably carrying said gauge heads from said base with their axes in parallel relationship, for limiting floating movement transverse their axes and with a resilient bias into the part passages, each gauge head carrying means comprising a ball slide free for limited floating movements on said base, bearing means in which each respective gauge head is carried for rotation, flexible leaf springs interconnecting the ball slides and the bearing means, each gauge head comprising contact means for engagement with an inner portion of the part passage for centering the gauge head relative thereto and diametrically opposed contacts situated at the extremities of a gauge head diameter disposed along the axis of the gauge head from the contact means, air leakage orifices inward of each of the contact means and controlled thereby in accordance with the displacements of the respective passage portions from the axis of the gauge head, the diameters defined by the air leakage gauging means being mutually parallel, a shaft connected to each gauge head and extending through its bearing support, a pinion fixed at the end of each of these shafts, a common gear meshing with the gauge head pinions, a manually actuated lever means connected to the common gear for equal rotation of the gauge heads about their axes, indicating means cooperating between the base and the lever means for indicating the degree of rotation of the gauge heads, and a pair of indicating means including fluid leakage measuring means, one of the fluid leakage measuring means being connected to those fluid leakage orifices disposed on one common side of the gauge heads and the other fluid leakage measuring means being connected to those orifices disposed in the opposite direction.

11. An apparatus for gauging a unit having a plurality of nozzle passages to determine the direction of resultant flow through the plural passages, comprising location means engaging a reference surface of the unit, a plurality of gauge heads, one for entry into each nozzle passage, means on said base supporting said heads with their axes in an angular relationship corresponding to the nominal axial relationship of the nozzle passages and for relative floating movement, each of said gauge heads comprising means associated with the wall of the respective passage at points spaced axially therealong cooperating to gauge the component of deviation of the passage axis from nominal in a given direction, and means connected to the plurality of gauging means responsive to the algebraic sum of the passage deviations from nominal in the given direction.

12. An apparatus for gauging a plurality of similar tapered passages in a part comprising: a base, location means carried from said base for engaging a reference surface of the part, a plurality of gauge heads, one for reception into each of said passages from the larger end thereof, means rotatably carrying said gauge heads from said base with their axes in an angular relationship corresponding to the nominal axial relationship of the passages for floating movement transverse their axes and with a resilient bias into the part passages, each gauge head comprising contact means for engagement with an inner portion of the part passage for centering the gauge head relative thereto and diametrically opposed contacts situated at the extremities of a gauge head diameter disposed along the axis of the gauge head from the contact means, air leakage orifices inward of each of the contact means and controlled thereby in accordance with the displacements of the respective passage portions from the axis of the gauge head and the deviation of the axis of respective passage from nominal, drive means connected to said gauge heads for simultaneous rotation thereof, and indicating means connected to said gauge heads responsive to the leakage through said orifices as determined by the passage dispositions.

13. An apparatus for gauging a plurality of passages in a part comprising a base, location means for engaging the part, a plurality of gauge heads, one for reception into each of said passages, means supporting said gauge heads on said base with their axes in an angular relationship corresponding to the nominal relationship of the passages to be gauged and for relative floating movement, each of said gauge heads including centering means for engaging the respective passage at one point therealong and air leakage gauging means displaced axially therefrom including opposed air leakage orifices respectively controlled by the proximity of opposite sides of the passage wall to the gauge head axis, the orifices being similarly disposed in the gauge heads in a predetermined relationship, a first air leakage measuring means connected to the orifices associated with corresponding sides of the passages and responsive to the total flow therethrough, and a second air leakage measuring means connected to the orifices at the other sides of the passages and responsive to the total flow therethrough.

14. The apparatus of claim 13 wherein the means supporting the gauge heads includes means carrying the heads for rotation and further comprising drive means connected for simultaneously rotating the heads about their axes.

15. Apparatus for gauging the resultant angular disposition or inclination of a plurality of axes of passages in a part relative to a reference axis of the part comprising a base, means on said base for locating a part for gauging and disposing the reference axis thereof in a predetermined disposition in the apparatus, a gauge head for each of the passages to be gauged, support means on said base carrying each of the gauge heads for insertion into one of the part passages, each of said gauge heads including means in simultaneous gaging association with axially spaced locations along the respective passage responsive to the angular relationship between the axis of the respective passage and the reference axis of the part and gauging means operatively connected to each of said gauge heads and conjointly controlled thereby responsive to the resultant angular disposition of the axes of the passages relative to the reference axis of the part.

16. An apparatus as set forth in claim 15 wherein said support means includes means carrying said gauge heads for rotation about axes parallel to the reference axis of the part, each of said gauge heads including means responsive to the angular relationship between the axis of the respective passage and the axis of rotation of the gauge head in a gauging plane including the axis of rotation, said apparatus further comprising drive means operatively connected to simultaneously rotate said gauge heads while maintaining said gauging planes in relatively parallel relationship.

17. An apparatus as set forth in claim 15 wherein said support means includes means carrying said gauge heads for relative floating movement, and each gauge head has centralizing contact means for engagement with the respective passage at one point therealong.

18. An apparatus for gauging a unit such as a rocket nozzle unit having a plurality of nozzle passages the axes of which are arranged in a plurality of different planes and which are equidistant from the axis of the part to determine the direction of resultant flow through the passages and the direction of resultant thrust of the unit comprising a base, means on said base for locating a unit in gauging position and disposing a reference axis thereof in a predetermined disposition in the apparatus, a gauge head on said base for cooperation with each of the nozzle passages, each of said gauge heads including means in simultaneous gaging association with axially spaced locations along the respective passage for determining the angular relationship between the thrust axis of the respective nozzle passage and the reference axis of the unit, and gauging means connected to each of said gauge heads and conjointly controlled thereby including means providing a gauging signal determined by the relationship between the resultant thrust axis of the plurality of passages and the reference axis of the unit.

References Cited in the file of this patent

UNITED STATES PATENTS

| | | |
|---|---|---|
| 2,400,293 | Dunn | May 14, 1946 |
| 2,403,898 | Aller | July 16, 1946 |
| 2,431,087 | Subber | Nov. 18, 1947 |
| 2,571,161 | Poole | Oct. 16, 1951 |
| 2,572,368 | Minix | Oct. 23, 1951 |
| 2,573,843 | Hendrix | Nov. 6, 1951 |
| 2,594,077 | Schulze | Apr. 22, 1952 |
| 2,621,416 | Brenneke | Dec. 16, 1952 |

OTHER REFERENCES

American Digest, page 185, Jan. 16, 1947.